United States Patent Office 2,806,838
Patented Sept. 17, 1957

2,806,838

UNSATURATED CARBAMATO ETHERS AND THIOETHERS, POLYMERS THEREOF, AND METHODS OF MAKING THEM

Sidney Melamed, Philadelphia, Pa., assignor to Rohm & Haas Company, Philadelphia, Pa., a corporation of Delaware No Drawing. Application July 15, 1955,
Serial No. 522,400

16 Claims. (Cl. 260—77.5)

This invention concerns novel carbamato ethers and thioethers containing a vinyl group, the polymers thereof and methods for making the monomers and polymers.

The new compounds of the present invention have the structure of Formula I:

I
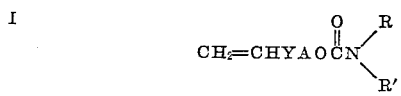

wherein Y is selected from the group consisting of oxygen and sulfur,

A is selected from the group consisting of cyclohexylene, alkylene groups having 2 to 10 carbon atoms of which at least 2 extend in a chain between the adjoining O and Y atoms, alkyleneoxyalkylene and polyoxyalkylene groups having 2 to 4 carbon atoms in the alkylene components of which at least 2 extend in a chain between adjacent O and Y atoms, R and R' are selected from the class consisting of composite groups consisting of tetramethylene, —(CH$_2$)$_4$—; pentamethylene, —(CH$_2$)$_5$; and 3-oxapentamethylene, —(CH$_2$)$_2$O(CH$_2$)$_2$—, forming a heterocycle with the adjoining nitrogen atom and separate members in which case R is selected from the group consisting of hydrogen, phenyl and alkyl groups having 1 to 4 carbon atoms, and R' is selected from the group consisting of hydrogen, cyclohexyl, phenyl, naphthyl, benzyl, alkyl groups having 1 to 22 carbon atoms, and R$^2$OCH$_2$— where R$^2$ is an alkyl group of 1 to 4 carbon atoms.

Compounds of Formula I in which R and R' are both hydrogen may be produced by the reaction of hydroxyalkyl vinyl ethers or sulfides of Formula II following:

II      CH$_2$=CH—Y—A—OH with urea. The compounds thereby produced have the structure of Formula III:

III
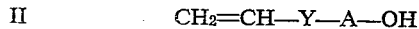

The reaction of urea with the compound of Formula II may be carried out at temperatures of 100° to 160° C., preferably between about 130° to 160° C. It is generally desirable to provide a basic catalyst, such as an alkali metal carbonate, including sodium, potassium, or lithium carbonates or an alkali metal cyanate, such as that of potassium or sodium. Alternatively oxides, such as zinc oxide, may be used as the alkaline catalyst. Generally, the cyanates are preferable in that they reduce discoloration in the reaction product. The reaction may be effected in the presence of a vacuum to assist the removal of ammonia, especially near the end of the reaction period. Instead of a vacuum or in addition thereto, an inert gas, such as nitrogen, helium or carbon dioxide, may be swept through the reaction vessel to assist in the removal of the ammonia. The urea and the compound of Formula II are mixed together preferably in about 1:1 mole ratio and heated to effect fusion within the temperature range given above. Generally the heated mixture becomes clear when it attains about 100° C. The reaction preferably is carried out under anhydrous or substantially anhydrous conditions, and, while a solvent such as water, ethyl acetate or other polar solvent may be employed in the reaction medium, it is preferred not to include a solvent. The products of Formula III thereby produced may be recovered from the reaction medium by distillation or recrystallization from solvents, such as water, ethyl acetate or the like. The products are generally low-melting solids.

Examples of hydroxyalkyl vinyl ethers or sulfides that may be used as one of the starting materials (the compound of Formula II) include:

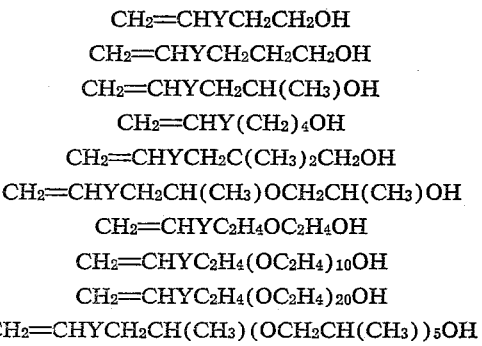

Compounds of Formula I in which one of the hydrogens on the terminal nitrogen is replaced with an R' group may be obtained by the reaction of a compound of Formula II above with an organic isocyanate of the Formula IV as follows:

IV      R'NCO

The products thereby obtained have the structure of Formula V:

V

To carry out this reaction equimolar amounts of the two reactants are mixed together generally in the presence of a solvent, such as benzene, ether or carbon tetrachloride. Preferably a small amount of basic catalyst, such as triethylamine, benzyl dimethylamine, or sodium or potassium methoxides, is added and the mixture is allowed to react at a temperature between 20° and 100° C., preferably at a temperature of 60° to 80° C., heat being introduced for this purpose if necessary. The reaction generally takes about 4 to 16 hours depending upon the particular isocyanate or compound of Formula II that are reacted together. Most of these compounds are of liquid character and they are readily isolated by distillation. This particular reaction produces a high yield, is accompanied by relatively low amounts of by-products, and it has the advantages of ease of purification of the products.

The organic isocyanates that may be employed include phenyl isocyanate, chlorophenyl isocyanate, benzyl isocyanate, naphthyl isocyanate, cyclohexyl isocyanate, methyl isocyanate, ethyl isocyanate, propyl isocyanate, isopropyl isocyanate, butyl isocyanate, isobutyl isocyanate, t-butyl isocyanate, amyl isocyanate, isoamyl isocyanate, hexyl isocyanate, octyl isocyanate, decyl isocyanate, dodecyl isocyanate, hexadecyl isocyanate, and oleyl isocyanate.

Compounds of the present invention having the formula VI:

VI
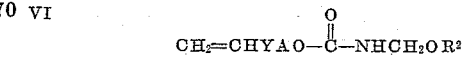

may be obtained by the reaction of a compound of the Formula II above with an alkoxymethyl isocyanate having the Formula VII:

VII  R²OCH₂NCO

The compounds of Formula VII may be made by the reaction of corresponding chloromethyl ethers with silver cyanate at a temperature of 20° to 50° C. with an inert solvent in accordance with known procedures. Examples of the compounds of Formula VII include methoxymethyl isocyanate, ethoxymethyl isocyanate, n-propoxymethyl isocyanate, i-propoxymethyl isocyanate, i-butoxymethyl isocyanate, n-butoxymethyl isocyanate.

The reaction of the isocyanate of Formula VII with a compound of Formula II is carried out in the same manner and under the same conditions as are stated hereinabove for the reaction between the organic isocyanate of Formula IV with the compound of Formula II. Like the preceding reaction, the products of the present reaction are obtained in high yield with a relatively low amount of by-products and have the advantage of ease of purification.

Compounds of Formula I, in which the terminal nitrogen is attached to no hydrogen atoms but to the other substituents represented by the radicals R and R' hereinabove, are obtained by the reaction of a compound of Formula II with a carbamyl chloride of Formula VIII:

VIII 

Examples of the carbamyl chlorides include dimethyl carbamyl chloride, diethyl carbamyl chloride, dipropyl carbamyl chloride, di-isopropyl carbamyl chloride, dibutyl carbamyl chloride, di-isobutyl carbamyl chloride, methyl ethyl carbamyl chloride, methyl propyl carbamyl chloride, methyl isopropyl carbamyl chloride, methyl butyl carbamyl chloride, methyl cyclohexyl carbamyl chloride, methyl octadecyl carbamyl chloride, ethyl isopropyl carbamyl chloride, ethyl octyl carbamyl chloride, ethyl hexadecyl carbamyl chloride, butyl octadecyl carbamyl chloride, hexyl octyl carbamyl chloride.

This last-mentioned reaction is carried out in the presence of a tertiary amine, such as triethylamine, pyridine, benzyl dimethylamine, or an inorganic base such as an alkali metal carbonate, including sodium or potassium carbonates or hydroxides, such as sodium or potassium hydroxide. When a tertiary amine is used as an acceptor for the hydrogen chloride, an inert organic solvent is preferably used, such as acetonitrile, ether, benzene, or carbon tetrachloride. When an inorganic base is used, it is preferable to include some water as well as the organic solvent to assist in the dissolution of the base. In either case, temperatures of 0° to 100° C., preferably about 40° to 80° C. in most cases, are employed. A reaction period of 2 to 12 hours is generally adequate. Preferably the carbamyl chloride is dripped into or added gradually to the solution of the compound of Formula II.

Those compounds of the present invention in which the terminal nitrogen is attached to two hydrogen atoms or to one hydrogen atom and another substituent, such as the compounds of Formulas II and V, are characteristically reactive with aldehydes, including formaldehyde. This reaction may be effected at temperatures of 30° to 70° C. or higher under alkaline conditions. The compounds of Formula VI correspond to the alkoxymethyl derivatives thereby obtained so that a separate reaction with an aldehyde and an alcohol is not required when compounds of Formula VI are employed. In other words, the compounds of Formula VI already contain a built-in or self-containing cross-linking component. All of these compounds, namely the compounds of Formulas III, V, and VI are adapted to be applied to paper, wood, leather, and to fabrics, especially of wool or cellulosic materials, including cotton and viscose rayon. By reacting the cellulosic materials, such as that of paper, cotton, rayon, or related fabrics with the monomeric compounds of Formulas III, V, and VI, these materials are modified by the introduction of groups which are capable of reacting with other monoethylenically unsaturated materials, such as styrene, amides of acrylic and methacrylic acid, acrylonitrile, methacrylonitrile, esters of acrylic acid or methacrylic acid with alcohols having 1 to 18 carbon atoms, such as methyl acrylate or methyl methacrylate as well as any of the other comonomers mentioned hereinafter. In this manner, permanent finishes may be applied to the fabrics or other articles to modify the hand, the water-absorbency, water-repellency, stiffness, crease-resistance, wrinkle-resistance, shrinkage-resistance, and the like. The compounds of Formula VI as well as the methylol or alkoxymethyl derivatives of the compounds of Formulas III and V may be used as molding, casting, laminating or adhesive resins since they are heat-convertible, especially when an acidic catalyst is added. Examples of acidic catalysts include ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)-aminomethane, 2-phenyl-2-amino-1-propanol, 2-methyl-2-amino-1-pentanol, 2-aminobutanol, tri-ethanolamine, 2-amino-2-ethyl-1-butanol, also ammonium chloride, pyridine hydrochloride, benzyldimethylamine oxalate.

Any of the compounds of Formulas III, V, and VI, even those which have not been methylolated, may be used as components for modifying other aminoplast resins of heat-convertible type, including those of urea-formaldehyde, triazine-formaldehyde resins, such as melamine-formaldehyde, thiourea-formaldehyde, and mixed resins of this type. Such modified aminoplast resins may be used for the treatment of paper, fabrics, wood, leather, for the various purposes mentioned hereinabove or for the molding or casting of various shaped articles and as laminating or adhesive resins, such as in the manufacture of plywood, safety glass, and the like.

The compounds of Formula III are generally soluble in water and polar organic solvents, such as the alcohols, including methanol, ethanol, and isopropanol, also in ethyl acetate, acetonitrile, acetone, dimethylformamide, and dimethylacetamide. The compounds of Formulas V and VI in which R' represents a group other than hydrogen are generally insoluble in water and soluble in the various polar organic solvents just mentioned and also in aromatic hydrocarbon solvents, such as benzene, toluene, and xylenes. Those compounds of Formula I, in which the terminal nitrogen contains two substituents so that it is not directly attached to any hydrogen atoms, are generally insoluble in water, but soluble in the polar organic solvents mentioned above, the aromatic hydrocarbon solvents, and also in aliphatic and naphthenic hydrocarbon solvents, including petroleum ether, hexene, heptane, and turpentine.

With the exception of the compounds of Formula III wherein the terminal nitrogen is attached directly to two hydrogen atoms, all of the compounds of Formula I are liquids. The compounds of Formula III, however, are generally low-melting solids.

The monomeric compounds of the present invention having the structure of Formula I are useful as pharmaceuticals, insecticides, bactericides, fungicides, herbicides, and as intermediates to produce new chemicals for the treatment of paper, wood, leather, and fabrics, especially textile fabrics of cotton, rayon, and the like. Those compounds of Formula I, in which the terminal nitrogen is completely substituted so that it is attached directly to any hydrogen atoms, are useful as solvents and plasticizers, particularly for cellulosic plastics, such as nitrocellulose, and cellulose esters, including cellulose acetate, cellulose propionate, cellulose acetate butyrate and the like.

The presence of the carbamato group makes the compounds of the present invention readily polymerizable by free-radical initiators to form homopolymers and copolymers which are in marked contrast with simple alkyl vinyl ethers. Thioethers of the present invention are generally more reactive and react at higher rates than the ethers. The sulfides may be converted to sulfoxides and sulfones. Both the ethers and sulfides are polymerizable by cationic or acid catalysts, such as $BF_3$, $SnCl_4$, $AlCl_3$. By conversion of the sulfides to sulfoxides or sulfones these monomers are polymerizable by anionic or basic catalysts, such as sodamide, potassamide, and lithium alkyl. The sulfides also add mercaptans in the beta-position to form new derivatives which cannot be formed from the simple ethers.

The polymers that are obtainable from the monomers of Formula I are quite distinct from polymers of allyl derivatives, such as N-allyl carbamates, O-allyl carbamates, and allyl urea which form only low molecular weight polymers at best. These allyl compounds are powerful chain transfer agents and this inhibits the formation of high molecular weight polymers.

The compounds of Formula I are all polymerizable to form homopolymers in the presence of azo catalysts. This homopolymerization may be carried out in bulk, solution, emulsion, or suspension procedures under neutral or slightly alkaline conditions. Generally, a temperature of 50° to 100° C. and a time of 2 to 24 hours is employed. From 0.5 to 10% by weight of an azo catalyst may be used based on the weight of monomer or total weight of monomers. In the solution procedure, it is preferred to have the monomer in a concentration of at least 50% by weight. In the emulsion or suspension procedures, an emulsifier may be employed, preferably of non-ionic type. Homopolymers may be obtained having molecular weights of 10,000 to 20,000 or more by any of these procedures.

Typical azo catalysts are azodiisobutyronitrile, azodiisobutyramide, dimethyl (or diethyl or dibutyl) azodiisobutyrate, azobis($a,\gamma$-dimethylvaleronitrile), azobis($a$-methylbutyronitrile), azobis($a$-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

The compounds of Formula I may also be copolymerized with other monoethylenically unsaturated polymerizable compounds in the presence of azo catalysts. When a large proportion of a comonomer of a type other than that of Formula I is to be copolymerized with the compound of the present invention, other free-radical catalysts may prove as desirable as azo catalysts. For example, organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used acrylic acid, methacrylic acid, esters of acrylic acid or methacrylic aid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters suh as vinyloxyethyl acetate, etc.; vinyl ethers such as ethyl vinyl ether, butyl vinyl ether, octyl vinyl, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, or divinylbenzene; ethylene diacrylate or dimethacrylate, bis(vinoxyethyl)-urea, vinoxyethyl acrylate, vinoxypropyl acrylate, etc. Where two polymerizable vinylidene groups occur in the same molecule, as in compounds toward the end of the above list, cross-linking results where more than one to two percent thereof is used in forming the copolymer.

The compounds of the present invention may also be polymerized by acid catalysts, such as sulfur dioxide or boron trifluoride. When sulfur dioxide is used, it is used in excess as a solvent and the polymers formed may contain $SO_2$ as a component. When boron trifluoride is used as the catalyst for polymerization, it is generally used in proportion slightly in excess of one mole of $BF_3$ per mole of the vinyl compound of the present invention.

Homopolymers obtained from the monomers having the structure of Formula III are water-soluble film-forming types of polymers adapted to be used in coatings and binders or bases for photographic emulsions. They are also useful as dye strippers to remove substantive dyes from dyed fabrics. The homopolymers obtained from the monomers, in which the terminal nitrogen is connected to only one hydrogen, as in those having the structure of Formula V and also the homopolymers of the monomers in which the terminal nitrogen is attached directly to no hydrogen atoms, are water-soluble in character but they are useful film-forming components adapted to be dissolved in organic solvents, including such polar solvents as ethyl acetate, acetone and dimethylformamide and hydrocarbon solvents, such as toluene and xylene. Such solutions are adapted to be coated on various substrates, including wood, metals, paper, leather and various fabrics to provide protective coatings thereon. The homopolymers of the monomers of Formula V may be used as warp sizes as they are readily removable on scouring for which purpose they may be emulsified in aqueous media by suitable emulsifying and dispersing agents. Homopolymers of the monomers of Formula I, in which the terminal nitrogen is completely substituted so that it is not directly attached to any hydrogen atoms, may be used as loom sizes for which purpose they may be applied by way or organic solvent solutions.

Homopolymers of the monomers having the structure of Formula VI as well as the methylol derivatives or alkoxymethyl derivatives of homopolymers of the monomers having the Formulas III and V may be applied to textiles and particularly those of cellulosic character, including cotton and rayon as well as those of nylon and wool, for various purposes including modifications of water-repellency or water-absorptivity, increasing the dimensional stability on washing, especially in the case of cellulosic types and crease-proofing. For this purpose, the homopolymer may be applied in the form of either an emulsion in water or as a solution in an organic solvent having concentrations of 5% to 15% and containing a small amount of an acidic catalyst, such as one of those mentioned hereinabove. The emulsion or solution may be applied by roller coating, dipping, brushing or spraying, and after removal of excess as by squeegeeing, the treated textile material may be dried and subsequently cured, such as at a temperature of about 220° F. to 400° F. for a period of five minutes to one-half hour. Emulsions or solutions of these homopolymers may also be applied as heat-convertible components of coatings on paper, wood, metals, leather or other substrates, and as in the case of textiles, they may be dried and cured at the temperatures and for times mentioned above.

Copolymers are similarly useful. For example, copolymers of the monomers having the structures of Formulas III and V may be applied as coatings on the various substrates mentioned above and especially to those of cellulosic textiles. For this purpose, the copolymers may contain anywhere from 5 mole percent to 99 mole percent of the compound of Formula I. In any of such applications, copolymers of the compounds of Formulas III and V may be treated with formaldehyde with or without lower alcohols either before or after application to the substrate to provide groups that are adapted to be condensed on heating, especially in the presence of the acidic catalysts hereinabove. Copolymers of a compound of Formula VI or a mixture of an aldehyde with a copolymer of a compound of one of the Formulas III and V may be used as casting or molding resins. In this use, the copolymers of Formula VI are particularly advantageous and produce molded articles of high heat-distortion temperatures which are suitable for canopies for aircraft, glazing, and so forth. The copolymers of 80% to 95% acrylonitrile with other comonomers including at least 5% by weight of a monomer of Formula I in which the terminal nitrogen is not attached to any hydrogen atoms directly are adapted to be used for the production of fibers, filaments and films which have improved dyeability and increased moisture regain as compared with simple acrylonitrile copolymers.

The monomeric compounds as well as the homopolymers and copolymers of the present invention are stable under normal conditions of storage. However, they can be hydrolyzed in the presence of acid or base. In such hydrolysis, a vinyloxyalkanol or a vinylthioalkanol, or a polymer thereof is obtained, from which the amine or carbamic acid derivatives obtained as by-products are adapted to be removed readily because of their solubility or volatility to leave the vinyloxyalkanol, vinylthioalkanol or polymer thereof.

In the following examples, which are illustrative of the invention, parts are by weight unless otherwise specifically indicated.

*Example 1*

A mixture of 2-hydroxyethyl vinyl sulfide, 52 grams (0.5 mole), urea, 30 grams (0.5 mole), and potassium cyanate, 1.0 gram is heated at 138° to 140° C. for seven hours. Approximately 0.3 mole of ammonia is collected in a trap. The reaction mixture is cooled and filtered to remove 16 grams of urea. The filtrate is diluted with benzene, washed with cold water, dried and distilled. The product, 7 grams, is obtained at 110°–112° C./1.1 mm. Hg. It is a crystalline solid at room temperature, soluble in water, methanol, and ethyl acetate. It contains by analysis 9.18% N and 21.4% S; the calculated values for vinylthioethyl carbamate, $$CH_2=CHSCH_2CH_2OCONH_2$$

are 9.54% N and 21.8% S.

The product is useful for the modification of cellulose, cotton, rayon, wool, nylon, wood, glass and similar materials. For this purpose, the compound is converted to a methylol derivative with aqueous formaldehyde at pH 8.5–9.0 at 60° C. for 2 hours and applied by brushing, dipping or other suitable means to the substrate to be modified. The coated material, article, fiber, and the like is then dried at 220° F. and cured at 200° to 300° F. for 5 to 1 minute. The treated article may then be readily and firmly bonded to polyester-vinyl type resins applied thereto in the form of solutions and then dried and cured, such as solutions of maleic polyesters in styrene to form sheets, laminates, and other formed objects with excellent adhesion between substrate and vinyl-polyester resin.

*Example 2*

A mixture of 44 grams (0.5 mole) of vinyloxyethanol and 30 grams (0.5 mole) of urea is heated to 145° C. in eight hours and 73% of the theoretical ammonia is collected. The brown residue, soluble in methanol, is distilled to give 14.6 grams of material, B. P. 114° to 134° C./5–1.0 mm. Hg. Redistillation gave 6.4 grams of 2-vinyloxyethyl carbamate as a pale yellow oil, B. P. 96° to 102° C./0.1 mm. Hg.

The product is useful as a component of aminoplast adhesives such as urea-formaldehyde condensates to impart increased reactivity and thereby shorten curing time at elevated temperatures. The compound reacts readily with formaldehyde to form a methylol derivative useful for the modification of reactive substrates such as cotton, wool, rayon and the like to impart thereto vinyl reactivity and improved bonding to such other vinyl-containing resins as polymers of polyvinyl chloride or acrylonitrile and especially their copolymers.

*Example 3*

A condensation is effected between 88 grams (1 mole) of 2-vinyloxyethanol and 71 grams (1 mole) of ethyl isocyanate in 200 ml. of benzene. No exotherm is observed on mixing and the mixture is heated to reflux for one hour. The mixture is treated with about 25 grams of activated alumina with stirring to remove peroxides. The product is isolated by distillation (after removal of the alumina by filtration) to give 120 grams (a 75% yield) of colorless oil, B. P. 79°–80° C./0.1 mm. Hg. The product, 2-vinyloxyethyl N-ethylcarbamate, of the formula

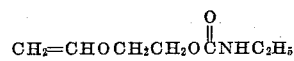

is insoluble in water, solidifies below 20° C. and contains by analysis 52.88% C; 8.19% H; and 8.80% N; the calculated values are 52.8% C; 8.18% H; and 8.81% N. The compound contains 24.3% vinyl ether by iodine titration and 25.7% by mercuric acetate titration; the calculated value is 27.0%.

A sample of the product is warmed at 60° C. in an aqueous solution of formaldehyde at pH 8.5 containing 2 molar equivalents of aldehyde. The resultant compound 2-(vinyloxy)-ethyl N-ethyl-N-methylolcarbamate is soluble in water. An 8% aqueous solution is made thereof and a viscose rayon fabric is padded therewith. After removal of excess, drying at 140° F. and curing at 230° F. for ten minutes, a crease-proofed fabric is obtained.

*Example 4*

A solution of 104 grams (1.0 mole) of 2-(vinylthio)-ethanol, 300 ml. of benzene, 72 grams (1.0 mole) of ethyl isocyanate and 4 ml. of triethylamine is heated at reflux for two hours. Distillation gives 150 grams (an 85% yield) of product, 2-(vinylthio)ethyl N-ethylcarbamate of the formula

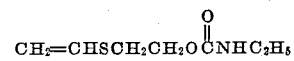

B. P. 101°–109° C./0.3 mm. Hg. The product is insoluble in water and soluble in acetone; it contains by analysis 8.0% nitrogen and 18.0% sulfur, the calculated values are 8.0 and 18.3 respectively.

The product is useful as an anti-oxidant and anti-skinning agent for paints formulated with drying oils. For such purposes amounts of 0.25 to 2.0% or more are added to the paint formulation.

*Example 5*

A solution of 475 grams (4.75 moles) of methyl methacrylate, 43.8 grams (0.25 mole) of 2-(vinylthio)ethyl N-ethylcarbamate, 631 grams of ethoxyethyl acetate and 5.2 grams of azobisisobutyronitrile is added in two hours to a pot heated at 80° C. and equipped with a stirrer. The mixture is treated twice at two-hour intervals with 2.6 gram-portions of the above nitrile initiator. The product, a colorless solution, has a Gardner-Holdt viscosity of Y (17.6 poises) at 38.6% solids.

*Example 6*

A solution of 450 grams of methyl methacrylate, 87.6 grams of 2-(vinylthio)ethyl N-ethylcarbamate, 653 grams of ethoxyethyl acetate and 5.4 grams of azobisisobutyronitrile is converted to a resin as in the previous example with a viscosity of 130 poises at 50.2% solids.

Example 7

Each of the polymer solutions of Examples 5 and 6 is admixed with 20% by weight, on the weight of resin, of N,N'-bis-methoxymethyl ethyleneurea and 0.75% of p-toluenesulfonic acid. Panels are prepared from each resin alone and each mixture by filming on glass and metal plates and baking at 300° F. for 30 minutes. All films have a pencil hardness of 5 H. The films obtained from the solution containing only the polymers of Examples 5 and 6 respectively were still soluble in ethoxyethyl acetate. The film obtained from the solution containing the ethyleneurea derivative and the polymer of Example 5 was only swollen by the aforesaid solvent after 24 hours submersion therein, while the film obtained from the solution containing both the ethyleneurea derivative and the polymer of Example 6 was completely resistant to the solvent even after 24 hours submersion therein. Thus, films may be prepared in all ranges of thermoplasticity and solvent resistance by variation of the ratio of the carbamate to acrylate or other vinyl monomer and by the use of additives. In addition to the additive specified above there may be used formaldehyde alone or aminoplast resins such as butylated urea-formaldehyde condensates or those derived from melamine. These are substituted for the cyclic urea in equivalent amounts by weight.

The coatings are characterized by high gloss, good adhesion to metal and excellent solvent-resistance when fully cured.

Example 8

A solution of 26 grams of 5-hydroxypentyl vinyl ether, 24 grams of phenyl isocyanate, 200 ml. of benzene and 2 ml. of triethylamine is warmed at 80° C. for 3 hours. The product, 5-vinyloxypentyl N-phenylcarbamate, is isolated by removing the benzene at reduced pressure. The product is insoluble in water but soluble in organic solvents like acetone, ethylene dichloride and ethanol.

The product is useful in the preparation of resins. Thus, it may be admixed in amounts of 10% to 50% with other nitrogen resin formers like urea and condensed with formaldehyde in the presence of acid. The resultant condensates are useful for coatings and castings.

Example 9

A solution of 14.6 grams of 5-hydroxypentyl vinyl sulfide, 15.4 grams of p-chlorophenylisocyanate, 200 ml. of benzene and 2 ml. of tri-butyl amine is heated at reflux for 4 hours. The benzene is stripped to give the product,

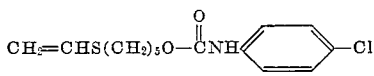

as a residue. The product contains by analysis sulfur, chlorine, and nitrogen and is readily soluble in organic solvents such as toluene, chloroform and acetone.

The compound is useful as a contact insecticide. Formulated as an emulsion concentrate and applied at a concentration of 1 part in 800, it controls aphids and spider mites. The product is also useful as an antitoxidant for cutting oils for which purpose the addition of 0.25 to 1% by weight is adequate.

Example 10

By the procedure of Example 2, there is condensed the monovinyl ether of diethylene glycol with an equivalent molar quantity of urea. The resultant product is isolated and consists largely of vinyloxyethoxyethyl carbamate.

The product is useful as an additive in the preparation of inks and resins providing long tack life and humectant properties.

Example 11

By the procedure of Example 2, there is condensed the monovinyl ether of decamethylene glycol with an equivalent molar quantity of urea. The temperature is raised to 140° C. and, after most of the ammonia evolution ceases, vacuum is applied to give a pressure of 10 to 20 mm. on the system and heating is continued to 160° C. The product is a semi-solid mass consisting largely of the water-insoluble product, 10-vinyloxydecyl carbamate.

A 10% solution in a butanol is made and applied to leather boots which are thereby made water-repellent.

Example 12

A solution of 50 parts of 2-hydroxypropyl vinyl ether and 50 parts of n-butyl isocyanate in 250 parts of benzene containing 2 parts of benzyldimethylamine (where all parts are by weight) is heated at reflux for 10 hours. Removal of the benzene and distillation gives 1-methyl-2-vinyloxy-ethyl N-n-butylcarbamate, an oily liquid containing 6.8% nitrogen and having the structure,

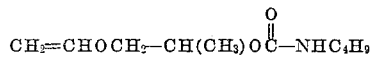

Example 13

By the procedure of Example 3, there is reacted 28.4 parts of 4-(vinyloxy)cyclohexanol and 31 parts of t-octyl isocyanate except that the time of reflux is 24 hours. The product, vinyloxycyclohexyl N-t-octylcarbamate, is isolated by removal of the benzene at reduced pressure. Parts are by weight.

Example 14

By the procedure of Example 13, there is reacted 30.4 grams of the monovinyl ether of hexaethylene glycol and 21.1 grams of n-dodecyl isocyanate to give the corresponding carbamate,

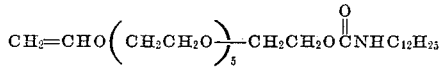

The product is useful as a low-foaming surfactant as a component in automatic dishwasher detergent formulations and in the processing of textiles.

Example 15

By the procedure of Example 4, except that reflux is continued for 10 hours, there is reacted 52 grams of 2-(vinylthio)ethanol and 113 grams of a mixed tertiary alkyl isocyanate where the alkyl group averages 13 carbons (from a mixture of propylene polymers and hydrogen cyanide). The product,

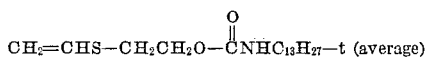

is a viscous oil readily soluble in organic solvents such as benzene, toluene, and xylene. It is added to lubricating oils in an amount of 0.25 to 1% to inhibit oxidation and corrosion.

Example 16

By the procedure of Example 15 but substituting for the isocyanate thereof an equivalent molar quantity of an alkyl isocyanate of 18 to 22 carbon atoms, there is prepared the homologous vinyl sulfide containing a mixture of alkyl groups corresponding to the formula,

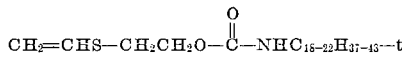

The compound is added in an amount of 0.25 to 1% to lubricating oils as an oxidation inhibitor therefor.

Example 17

A mixture of 26 grams of 2,2-dimethyl-3-hydroxypropyl vinyl ether and 27 grams of benzyl isocyanate is treated by the procedure of Example 3 to given an excellent yield of the desired carbamate,

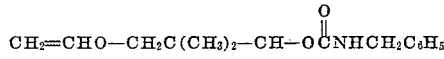

The compound contains by analysis 5.2% nitrogen; the calculated value is 5.33%.

The product forms a methylol derivative upon reaction with formaldehyde in methanol at pH 8.5 to 9.0 at 60° to 70° C. for two hours. The resultant methylol compound or the parent carbamate itself is useful for the modification of urea-formaldehyde or melamine-formaldehyde resins. For example, the unmethylolated product is admixed in amounts of 20% to 50% by weight with 80% to 50% of a urea-formaldehyde molding powder and molded under the conditions suitable for the aminoplast resin itself. The resultant molded product has improved impact and water-resistance. Fillers, such as wood flour, sawdust, glass fibers, asbestos or the like, may be used in such compositions, if desired.

*Example 18*

The product of Example 1, 10 parts, is dissolved in 25 parts of a 40% solution of formaldehyde in methanol adjusted to pH 8.5 to 9.0. The solution is warmed at 60° C. for several hours. The pH is then adjusted to 7.0 and the excess reagents and solvent removed at reduced pressure by stripping. The viscous residue consists largely of 2-(vinylthio)ethyl N-methylolcarbamate,

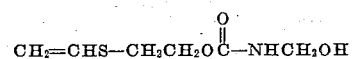

The product contains by analysis nitrogen, sulfur and combined formaldehyde and is contaminated with a small amount of salt.

The product is useful for the modification of textiles, films, sheeting, and the like. For example, a cotton fabric is dipped into a 10% solution of the product and the fabric is dried at 220° F. A portion of the dried, treated fabric is rewet by spraying with a dilute (1%) solution of ammonium chloride and redried and cured at 220° F. for 10 minutes. The resultant material has a modified reactivity and may be more readily reacted with such compounds as acrylonitrile to produce cyanoethylated products having modified hand and moisture-absorption characteristics with long chain aliphatic isocyanates, such as octadecyl isocyanate, to give water-repellent materials or with carbon disulfide to give xanthates which can be dissolved in caustic soda and extruded or spun into the form of fibers, films, sheets, etc. It is believed that the improved reactivity is the result of hydroxyethylcarbamate groups introduced into the cellulose chains by consecutive condensation and hydrolysis reactions.

A second portion of the original treated fabric, not rewet with acid catalyst but cured, is dipped in butyl methacrylate containing 1% by weight of azobisisobutyronitrile. The fabric is cured in an oven containing an atmosphere of nitrogen at 212° F. for one hour. The resultant material has a full, rubbery hand and the methacrylate polymer is intimately bound to the fabric.

In the preparation of the methylol compound, the solvent, methanol, may be entirely or partly replaced with an equivalent amount of water. The aqueous solution of the methylol compound may be used to treat fabrics as above or may be admixed with other aminoplast resins in solution.

In a like manner, the product of Example 2 is converted to a methylol derivative which has similar reactivities and serves to provide modified fibers, yarns or fabrics of cotton, rayon, or other cellulosic materials having hydroxyl groups.

*Example 19*

(a) A mixture of 26 grams of 5-hydroxypentyl vinyl ether and 17.4 grams of methoxymethyl isocyanate is treated as in Example 3 to give as the product 5-(vinyloxy)pentyl N-(methoxymethyl)carbamate,

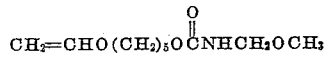

The liquid product dissolves readily in ethyl acetate, methanol or dimethylformamide.

(b) Similarly, 26 grams of 5-hydroxypentyl vinyl ether is condensed with 26 grams of butoxymethyl isocyanate to give the corresponding butyl homolog,

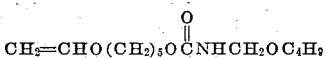

The product is an oily liquid readily soluble in organic solvents like benzene, alcohol and ethyl acetate.

*Example 20*

A solution of 88 grams of hydroxyethyl vinyl ether and 88 grams of pyridine in 200 ml. of chloroform is treated slowly at 15° to 20° C. with 107 grams of dimethylcarbamyl chloride. The reaction is stirred for 8 hours; the pyridine hydrochloride is removed by filtration, and the product is isolated from the filtrate by distillation as a colorless oil, B. P. 80° to 90° C./10 to 14 mm. Hg. The product, 2-vinyloxyethyl N,N-dimethylcarbamate of the formula

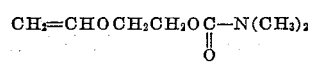

contains 8.6% nitrogen by analysis, the calculated value being 8.8%. The compound in soluble in alcohols and ketones as well as benzene and toluene.

*Example 21*

By the procedure of Example 20, there is condensed 52 grams of 2-(vinylthio)ethanol and 95.5 grams of dibutylcarbamyl chloride to give 2-vinylthioethyl N,N-dibutylcarbamate,

*Example 22*

By the procedure of Example 20, there is condensed 13 grams of 2,2-dimethyl-3-hydroxypropyl vinyl ether and 14.7 grams of N,N-pentamethylenecarbamyl chloride. The product is a distillable oil,

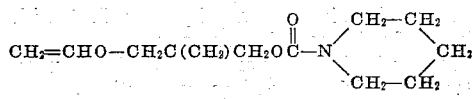

soluble in ethanol and benzene.

*Example 23*

The condensation of 15 grams of the carbamyl chloride derived from morpholine,

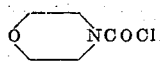

and 13 grams of 5-(hydroxypentyl) vinyl ether by the procedure of Example 20 gives the corresponding carbamate,

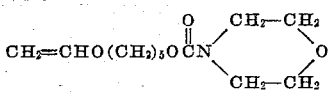

The product is a distillable oil readily soluble in organic solvents like methanol, acetone and ethyl acetate.

*Example 24*

Cyclohexyl isocyanate, 25 grams, and 2-hydroxyethyl vinyl ether, 17.5 grams, are condensed by the procedure of Example 3 to give vinyloxyethyl N-cyclohexylcarbamate,

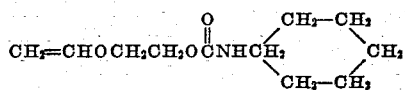

*Example 25*

(a) A solution of 50 parts of the product of Example 1 in 50 parts by weight of dimethylformamide with 0.75 part of dimethyl azodiisobutyrate is heated in a nitrogen atmosphere at 75° C. for 16 hours. The polymeric product is isolated by precipitation with acetone. The product is soluble in water and is an addition polymer composed of units of the monomer of Example 1.

(b) A solution of the polymer (of part a hereof) in methanol is added to a cellulose acetate dope in acetone at 5% polymeric carbamate on cellulose solid. The dope is then extruded through a slot orifice to form a film. A portion of the film is after-treated with aqueous 37.7% formaldehyde containing 1% hydrochloric acid. Samples of each film are dried and cured at 250° F. for 10 minutes. Both samples show increased receptivity to dyes, such as acid or basic dyes, and the formaldehyde-treated film was resistant to dry-cleaning solvents.

(c) A solution of the polymer (of part a hereof) is prepared by dissolving 10 parts in 50 parts by weight of 10% aqueous formaldehyde at pH 8.5 and warming at 60° to 70° C. for two hours. The resultant product is an aqueous solution of the poly-methylol derivative of the polymer containing units corresponding to

The product is useful for imparting wet-strength to paper. For this purpose, 2% by weight of poly-methylol polymers based on unbleached kraft pulp is added to the beater, the pH adjusted to 4.0 and sheets formed in the usual manner. The resultant paper shows a high degree of wet-strength.

The product is useful for the treatment of textiles, including cotton, rayon, and nylon fabrics to impart wash-resistant crispness and dimensional stability. For this purpose, from 1% to 5% by weight of resin on fabric is sufficient, the fabric being cured at 220° to 250° F. for 5 to 10 minutes. The product is also useful as a tire-cord adhesive. The polymer solution is added to rubber latex (10% of polymer on rubber) and rayon tire cord dipped in this mixture and air-dried. These treated cords are then used in the preparation of H-shaped tire carcass test strips which are cured at 250° to 300° F. A 2 to 3 fold increase in adhesion between fabric and rubber at failure is observed with very little cord-to-rubber failure.

Example 26

A polymer of the product of Example 3 is prepared by the procedure of Example 25(a). The polymer is soluble in methanol and ethanol or mixtures of either of these alcohols and water. Solutions of the polymer are useful for the formation of films, as an additive to cellulose acetate spinning dopes and for the modification of other film-forming materials.

The polymer is converted to a poly-methylol derivative with formaldehyde in methanol. The resultant material is useful as a modifier for aminoplast resins, for treating of textiles and as an additive to latex for making tire-cord adhesives.

Example 27

A polymer of the product of Example 9 is prepared as described in Example 25(a). The polymer is a non-migrating plasticizer for polyvinyl chloride resins, amounts of 20% to 50% by weight of the vinyl chloride being preferred.

Example 28

A solution of 2 parts by weight of azodiisobutyronitrile in 50 parts of the product of Example 15 is heated at 65° C. for 16 hours in an inert atmosphere of nitrogen. The polymer is a very viscous oil soluble in lubricating and cutting oils in which the incorporation of 0.25 to 1% serves to inhibit oxidation and corrosion. The product is also useful for the treatment of cloth to impart water-repellency and softness. For this purpose the product is best dissolved in xylene and then the xylene solution is emulsified in water; application to the cloth is accomplished at concentrations of 2% to 15% by dipping, padding or spraying and subsequent drying.

Example 29

A solution of 20 parts of the product of Example 19 in 10 parts by weight of methanol and 0.4 part of dimethyl azodiisobutyrate is heated at reflux for 12 hours. A small amount, 0.5 to 1% by weight, of p-toluenesulfonic acid is admixed with the polymer in a 15% solution thereof in butanol and the resultant solution applied to paper, wood, glass, and metal, and cured at 250° F. for 5 to 30 minutes. The resultant films are hard and solvent-resistant with good adherence. The polymer solution is also useful for the treatment of fabrics; in this case ammonium chloride or ethanolamine hydrochloride is preferred as a catalyst instead of the p-toluenesulfonic acid.

Example 30

A suspension of the product of Example 20 prepared in petroleum ether by mechanical agitation is treated with 2% by weight of monomer of azodiisobutyronitrile and the mixture is heated at 65° C. for ten hours. The polymeric product separates and is easily removed from the petroleum ether. The product is soluble in butanol and xylene. It is useful as a plasticizer for cellulose acetate and cellulose butyrate in amounts of from 10% to 50% and can be admixed from solution or by milling.

Example 31

A solution of 5 parts of the product of Example 19(b) in 95 parts of methyl methacrylate containing 0.25 part of p-toluenesulfonic acid and 0.02 part of benzoyl peroxide is cast between sheets of glass at 65° to 70° C. for 12 hours and then cured at 100° to 120° C. for two hours. The resultant sheet is clear and transparent with improved craze-resistance. It is resistant to heat distortion at temperatures up to and somewhat in excess of 110° C. and is thus useful for glazing, decorating, sign manufacture and the like.

Example 32

A mixture where all parts are by weight of 90 parts of butyl acrylate and 10 parts of the product of Example 4 is emulsified in 180 parts of water with 5 parts of soap; 1 part of diethylene triamine and 0.3 part of ammonium persulfate are then added, and the mixture is allowed to react exothermally until the temperature reaches 40° C. The resultant emulsion, containing a copolymer of the monomers cited above, is stable and useful for the treatment of wool to impart dimensional stability and felting resistance. A sample of woolen fabric is padded through the emulsion diluted to 10% solids to give a 5% resin pick-up on fabric weight. The fabric is then cured at 220° F. for 5 minutes. After 300 minutes of laundering the fabric shows only 8% total shrinkage compared to 40% to 45% for an untreated control.

Example 33

A mixture (where parts are by weight) of 90 parts of acrylonitrile and 10 parts of the compound of Example 3 is emulsified in 180 parts of water and polymerization is effected as described in Example 32. The copolymer obtained is coagulated, dried, dissolved in dimethylformamide and spun into fibers. The resultant fibers are stretched and heated to 180° C. for a short time. The resultant fibers are readily dyed and show improved tensile and heat-retraction properties.

Example 34

A mixture of equal parts by weight of lauryl vinyl sulfide and the monomer of Example 16 is polymerized in an equal volume of mineral oil with 1% of azodiisobutyronitrile as the initiator. The resultant polymer is added to a lubricating oil in an amount of 1% to 10% by weight to impart oxidative stability and improve the viscosity index thereof.

Example 35

A copolymer of 60 parts of vinyl acetate and 40 parts of the product of Example 21 is prepared as described in Example 32. The emulsion is useful as a coatings vehicle. It may be applied as a clear finish to masonite, masonry, brick, cement, stucco, plaster, wood, and the like. It may be pigmented with titania, clay, calcium carbonate or other pigments and extenders; thickeners, stabilizers, colors and other adjuvants may be added and the product used as a finish for the materials mentioned above.

Example 36

A copolymer of 40 parts of butyl methacrylate and 60 parts of the product of Example 23 is prepared as described in Example 32. The polymer solution is useful as a pigment binder for the printing of textiles. It is also useful as a binder for clay coatings for paper and paperboard. Mixtures of 15% to 50% of resin and 85% to 50% of clay or clay-titania mixtures are applied by roller coating to paper and paperboard. Short cures at 100° to 120° F. gives smooth, glossy finishes.

It is to be understood that changes and variations may be made without departing from the spirit and scope of the invention as defined in the appended claims.

I claim:

1. As a composition of matter, a compound of Formula I:

I
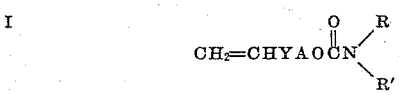

wherein Y is selected from the group consisting of oxygen and sulfur, A is selected from the group consisting of cyclohexylene, alkylene groups having 2 to 10 carbon atoms of which at least 2 extend in a chain between the adjoining O and Y atoms, alkyleneoxyalkylene and polyoxyalkylene groups having 2 to 4 carbon atoms in the alkylene components of which at least 2 extend in a chain between the adjoining O and Y atoms, R and R', when directly connected to each other, together form a composite group selected from the class consisting of tetramethylene, pentamethylene, and 3-oxapentamethylene, and form a heterocycle with the adjoining nitrogen atom, R, when not directly connected to R', is selected from the group consisting of hydrogen, phenyl and alkyl groups having 1 to 4 carbon atoms, and R', when not directly connected to R, is selected from the group consisting of hydrogen, cyclohexyl, phenyl, naphthyl, benzyl, alkyl groups having 1 to 22 carbon atoms, and $R^2OCH_2$— where $R^2$ is an alkyl group of 1 to 4 carbon atoms.

2. An addition polymer of a compound defined in claim 1.

3. A compound of the formula

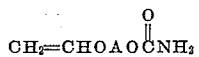

wherein A is an alkylene group having 2 to 10 carbon atoms, of which at least 2 extend in a chain between the adjoining oxygen atoms of the formula.

4. A compound of the formula

wherein A is an alkylene group having 2 to 10 carbon atoms, of which at least 2 extend in a chain between the adjoining oxygen atoms of the formula, and R' is an alkyl group having 1 to 22 carbon atoms.

5. A compound of the formula

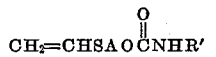

wherein A is an alkylene group having 2 to 10 carbon atoms, of which at least 2 extend in a chain between the adjoining oxygen atoms of the formula, and R' is an alkyl group having 1 to 22 carbon atoms.

6. A compound of the formula

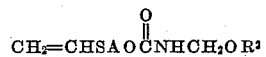

wherein A is an alkylene group having 2 to 10 carbon atoms, of which at least 2 extend in a chain between the adjoining O and S atoms of the formula, and $R^2$ is an alkyl group of 1 to 4 carbon atoms.

7. A compound of the formula

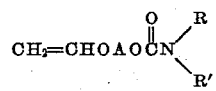

wherein A is an alkylene group having 2 to 10 carbon atoms, of which at least 2 extend in a chain between the adjoining oxygen atoms of the formula, R is an alkyl group having 1 to 4 carbon atoms, and R' is an alkyl group having 1 to 22 carbon atoms.

8. 2-vinyloxyethylcarbamate.
9. 2-vinyloxyethyl N-ethylcarbamate.
10. 2-vinylthioethyl N-ethylcarbamate.
11. A polymer of a compound defined in claim 10.
12. 2-vinyloxyethyl N,N-dimethylcarbamate.
13. A copolymer of acrylonitrile with 2-vinyloxyethyl N-ethylcarbamate.
14. A copolymer of methyl methacrylate with 2-vinylthioethyl N-ethylcarbamate.
15. A copolymer of butyl acrylate with 2-vinylthioethyl N-ethylcarbamate.
16. A method for producing a compound of claim 1 comprising reacting a compound of the formula $CH_2$=CHYAOH wherein Y is selected from the group consisting of oxygen and sulfur, and A is selected from alkylene groups having 2 to 10 carbon atoms, of which at least 2 extend in a chain between the O and Y atoms of the formula, with an organic isocyanate having the formula R'NCO, wherein R' is selected from the group consisting of hydrogen, cyclohexyl, phenyl, naphthyl, benzyl, alkyl groups having 1 to 22 carbon atoms, and $R^2OCH_2$, where $R^2$ is an alkyl group of 1 to 4 carbon atoms.

No references cited.